US010730639B2

(12) United States Patent
Depta et al.

(10) Patent No.: US 10,730,639 B2
(45) Date of Patent: Aug. 4, 2020

(54) AIRCRAFT VERTICAL STABILIZER ILLUMINATION LIGHT AND AIRCRAFT COMPRISING THE SAME

(71) Applicant: Goodrich Lighting Systems GmbH, Lippstadt (DE)

(72) Inventors: Marion Depta, Lippstadt (DE); Andre Hessling-Von Heimendahl, Koblenz (DE); Anil Kumar Jha, Lippstadt (DE); Andreas Ueberschaer, Guetersloh (DE); Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/277,119

(22) Filed: Feb. 15, 2019

(65) Prior Publication Data

US 2019/0256223 A1     Aug. 22, 2019

(30) Foreign Application Priority Data

Feb. 16, 2018   (EP) ..................................... 18157227

(51) Int. Cl.
*B64D 47/06* (2006.01)
*B64C 5/02* (2006.01)
*B64C 5/06* (2006.01)

(52) U.S. Cl.
CPC ............... *B64D 47/06* (2013.01); *B64C 5/02* (2013.01); *B64C 5/06* (2013.01); *B64D 2203/00* (2013.01)

(58) Field of Classification Search
CPC ...... B64D 47/06; B64D 2203/00; B64C 5/02; B64C 5/06
See application file for complete search history.

(56) References Cited

U.S. PATENT DOCUMENTS

| | | | |
|---|---|---|---|
| 8,579,479 B2* | 11/2013 | Kohlmeier-Beckmann | B64D 47/06 362/470 |
| 9,718,560 B2* | 8/2017 | Lapujade | B64D 47/04 |
| 10,269,274 B2* | 4/2019 | De Brouwer | B64D 47/06 |
| 10,351,258 B1* | 7/2019 | Barnes | A01M 29/08 |
| 2002/0105800 A1 | 8/2002 | Tufte | |
| 2006/0007013 A1* | 1/2006 | Singer | B64D 47/06 340/815.45 |

(Continued)

FOREIGN PATENT DOCUMENTS

| | | |
|---|---|---|
| DE | 102016203374 A1 | 9/2017 |
| EP | 2565118 A2 | 3/2013 |
| EP | 3072816 A1 | 9/2016 |

OTHER PUBLICATIONS

Extended European Search Report for International Application No. 18157227.2 dated Aug. 8, 2018, 7 pages.

*Primary Examiner* — Donald L Raleigh
(74) *Attorney, Agent, or Firm* — Cantor Colburn LLP

(57) ABSTRACT

An aircraft vertical stabilizer illumination light, configured to illuminate a vertical stabilizer of an aircraft, has a housing having a length (L), a width (W), and a height (H), the length (L) being greater than the width (W) and the height (H); and a plurality of light sources being arranged spaced along the length (L) of the housing (8) for a distributed illumination of the vertical stabilizer, wherein the housing (8) is configured to be mounted adjacent the vertical stabilizer on a tail portion of a fuselage of the aircraft.

20 Claims, 9 Drawing Sheets

(56) References Cited

U.S. PATENT DOCUMENTS

| | | | | |
|---|---|---|---|---|
| 2010/0046241 A1* | 2/2010 | Lundberg | ............... | B64D 47/06 |
| | | | | 362/470 |
| 2013/0077330 A1* | 3/2013 | Hessling | ................ | B64D 47/06 |
| | | | | 362/470 |
| 2014/0370256 A1* | 12/2014 | Benthien | ................... | B64C 1/00 |
| | | | | 428/212 |
| 2015/0146443 A1* | 5/2015 | Gagnon | ................. | B64D 47/02 |
| | | | | 362/470 |
| 2016/0046390 A1* | 2/2016 | Von Heimendahl | .... | F21V 17/06 |
| 2016/0195239 A1* | 7/2016 | Jha | ......................... | B64D 47/04 |
| | | | | 362/470 |
| 2017/0181246 A1* | 6/2017 | Hessling-Von Heimendahl | ......... | |
| | | | | F21V 17/06 |
| 2017/0233101 A1* | 8/2017 | Hessling-Von Heimendahl | ......... | |
| | | | | B64D 47/04 |
| | | | | 362/470 |

\* cited by examiner

AIRCRAFT VERTICAL STABILIZER ILLUMINATION LIGHT AND AIRCRAFT COMPRISING THE SAME

FOREIGN PRIORITY

This application claims priority to European Patent Application No. 18157227.2 filed Feb. 16, 2018, the entire contents of which is incorporated herein by reference.

BACKGROUND

The present invention is in the field of exterior aircraft lighting. In particular, the present invention relates to lights effecting the illumination of the vertical stabilizer at the tail of an aircraft. Such lights are sometimes also referred to as logo lights. The present invention also relates to aircraft comprising such aircraft vertical stabilizer illumination lights.

Large commercial aircraft have many different exterior lights. An exemplary group of exterior aircraft lights are lights for passive visibility, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights.

Illumination of vertical stabilizers of aircraft, generally present in the tail region of the aircraft, is known in the art. Illuminating aircraft vertical stabilizers is useful, among other things for notifying neighboring aircraft of the presence and location of the tail of the aircraft and for displaying airline logos. Lights for illuminating the vertical stabilizer at the tail of an aircraft have a number of purposes. They allow for inspection of the vertical stabilizer in the dark, such as during an operational check of the rudder. They provide an indication of the location of the aircraft in the dark, because the illuminated area is a good estimate of where the tail end of the aircraft is. They help in identifying aircraft during the approach or during taxiing on the air field, because the vertical stabilizer commonly contains an airline logo. For this reason, the aircraft vertical stabilizer illumination lights are often also referred to as logo lights. Previous approaches of aircraft vertical stabilizer illumination lights have not been entirely satisfactory. In particular, previous approaches of aircraft vertical stabilizer illumination lights had deficiencies in terms of output efficiency, i.e. light was wasted, in terms of largely non-uniform illumination of the vertical stabilizer, and/or in terms of large system complexity.

Accordingly, it would be beneficial to provide an improved aircraft vertical stabilizer illumination light and an aircraft equipped therewith. In particular, it would be beneficial to provide an aircraft vertical stabilizer illumination light allowing for a good compromise between output efficiency, uniformity of illumination of the vertical stabilizer, and low system complexity.

SUMMARY

Exemplary embodiments of the invention include an aircraft vertical stabilizer illumination light, configured to illuminate a vertical stabilizer of an aircraft, comprising: a housing having a length, a width, and a height, the length being greater than the width and the height; and a plurality of light sources arranged spaced along the length of the housing for a distributed illumination of the vertical stabilizer; wherein the housing is configured to be mounted adjacent the vertical stabilizer on a tail portion of a fuselage of the aircraft.

Exemplary embodiments of the invention allow for a beneficial compromise between efficiency, uniformity of illumination of the vertical stabilizer, and low system complexity. With the plurality of light sources being distributed along the length of the housing, illumination of the vertical stabilizer may be carried out from various positions along the vertical stabilizer. In this way, the task of illuminating the vertical stabilizer may be split up between light sources in different positions, which allows for the combination of more targeted light outputs. As compared to previous approaches, which relied on one or more light sources in a densely packed light unit, the distributed illumination of the vertical stabilizer allows for less loss or stray light cast beyond and/or to the sides of the vertical stabilizer and/or for less system complexity. Also, with the housing being configured to be mounted to the fuselage of the aircraft and with the aircraft vertical stabilizer illumination light thus having a set position with respect to the vertical stabilizer, the illumination of the vertical stabilizer may be kept constant during all phases of the flight. As compared to previous approaches, where the aircraft vertical stabilizer illumination light was arranged in a horizontal stabilizer, which moves for controlling the aircraft, the illumination of the vertical stabilizer is more constant with the present approach. Exemplary embodiments of the invention can also allow for lower weights than previous approaches and/or may be produced and installed in a more cost-effective manner.

The housing has a length that is greater than the width and the height thereof. In this way, the aircraft vertical stabilizer illumination light has an elongated shape and has an elongated light output surface. As compared to previous approaches, where the light output surface was circular or close to quadratic, the maximum distance between two points of the light output surface is larger, allowing for a greater degree of freedom in shaping the output light intensity distribution of the aircraft vertical stabilizer illumination light.

The length, width, and height of the housing are the physical extensions of the housing, in case the housing has a cuboid form. If the outer contours of the housing do not jointly form a cuboid, the length, width, and height are defined as the dimensions of the cuboid circumscribing the housing.

The housing of the aircraft vertical stabilizer illumination light is configured to be mounted adjacent the vertical stabilizer of the aircraft. In particular, the housing may be configured to be mounted along the vertical stabilizer. Further in particular, the housing may be configured to be mounted along the vertical stabilizer, with the length of the housing being arranged substantially along the vertical stabilizer, i.e. along the longitudinal extension of the vertical stabilizer in the aircraft frame of references.

The following features, described in the context of further embodiments, may be applied to the aircraft vertical stabilizer illumination light in any combination or subset.

According to a further embodiment, the plurality of light sources are arranged in a substantially linear manner. In particular, the plurality of light sources may be arranged within 15%, in particular within 5%, further in particular within 1%, of the width (W) from a longitudinal axis of the housing bisecting the width. In other words, the plurality of light sources may be arranged in close proximity to a longitudinal axis of the housing. The invention may have a linear alignment of light sources or substantially linear alignment thereof, e.g. as linear as customary manufacturing allows. The light sources may be provided in one, two, or three rows, particularly in one row. With the plurality of light sources being arranged in a substantially linear manner, the aircraft vertical stabilizer illumination light may provide for very uniform illumination conditions along the vertical stabilizer. This is in particular the case, if the aircraft vertical stabilizer illumination light is mounted to the fuselage substantially in parallel to the foot of the vertical stabilizer.

According to a further embodiment, the housing comprises a mounting structure. The housing may in particular be a mounting plate or a mounting structure that is u-shaped in cross-section. Also, the mounting structure may have a constant cross-section along the length. It is also possible that the cross-section along the length narrows towards one or both of the ends of the housing. This may help in providing favorable aerodynamic properties of the aircraft vertical stabilizer illumination light.

According to a further embodiment, the housing is configured for being mounted to an outside skin of the tail portion of the fuselage or the housing is configured to be inserted into a corresponding recess in the tail portion of the fuselage. The former may be achieved with a mounting structure in the form of a mounting plate. The latter may be achieved with a tub-shaped mounting structure, in particular with a mounting structure having a u-shaped cross-section along the length. While mounting the housing to the outside skin of the fuselage allows for a very easy and quick installation of the aircraft vertical stabilizer illumination light, inserting the mounting structure into a corresponding recess may provide for a very low aerodynamic impact of the aircraft vertical stabilizer illumination light.

According to a further embodiment, the housing further comprises a lens cover, in particular a lens cover resistant to temperatures in a range of from −55 to +70° C. and/or resistant to hydraulic fluid present in a jet aircraft operational environment. The temperature tolerance may be at least −30° C., or at least −40° C., or at least −50° C. Such temperature tolerances may allow the lens cover to survive harsh upper atmospheric air environments, including air, rain, and/or ice contact or flow-by at velocities of more than 500 km/h and up to 1000 km/h. With the lens cover being resistant to hydraulic fluid present in a jet aircraft operational environment, it may be ensured that the aircraft vertical stabilizer illumination light can work in an unimpeded manner, regardless of the jet engine exhaust that may reach the tail portion of the fuselage.

The lens cover may be formed as a single, contiguous sheet, i.e., one cast, extruded, or otherwise formed, in a single event and/or lacking breaks in the structure. Such a structure may have increased strength and/or decreased air or fluid resistance.

The housing, in particular the lens cover thereof, may comprise smoothed ends suitable to minimize air resistance in flight. In particular, the height of the housing may decrease towards one or both of the front end and the back end of the aircraft vertical stabilizer illumination light.

The lens cover may comprise glass, polycarbonate, or polymethylmethacrylate. In particular, the lens cover my essentially consist of or consist of glass, polycarbonate, or polymethylmethacrylate.

The lens cover may be rounded at its longitudinal ends, or tapering longitudinally outwardly from its longitudinal center. The lens cover may further or alternatively be rounded in the cross-section orthogonal to its longitudinal axis, e.g., as a half-pipe, or may be squared or v-shaped. If the aircraft vertical stabilizer illumination light is sunken into the fuselage, the lens cover may be flat or shaped like the fuselage, such that the lens cover is flush with the aircraft fuselage. Such shaping may improve the aerodynamics of the aircraft vertical stabilizer illumination light and, thus, of the aircraft as a whole.

According to a further embodiment, the plurality of light sources comprise 2 to 15, in particular 4 to 12, further in particular 6 to 9, light sources per meter along the length of the housing. Unlike aircraft vertical stabilizer illumination lights of previous approaches, the aircraft vertical stabilizer illumination light according to exemplary embodiments of the invention may include a plurality of light sources, such as 3 to 14 light sources or 5 to 11 light sources, in particular 5, 6, 7, 8, 9 or 10 light sources. The aircraft vertical stabilizer illumination light according to exemplary embodiments of the invention may have 2 to 10-fold, 3 to 8-fold, 4 to 7-fold, or 5, 6, or 7-fold the light sources of previous approaches. The increased number of light sources distributed along the longitudinal axis of the aircraft vertical stabilizer illumination light allows for an improved, more targeted, and/or better focused illumination of the vertical stabilizer. This illumination may have less stray light, which is not only more energy efficient, but also less disturbing to nearby pilots.

According to a further embodiment, the plurality of light sources are LEDs. Due to their small size, LEDs are particularly suitable for being used in large numbers. Also, they can be conveniently provided with individual optical systems, as described below. LEDs are further a very energy-efficient kind of light source and have a long life time.

The light sources may be the same or different light sources, i.e., there may be 2, 3, 4, or more different types of light sources in the aircraft vertical stabilizer illumination light. The aircraft vertical stabilizer illumination light may contain nominally identical light sources for economic reasons. Also, the same light output per current may be achieved in a convenient manner by providing nominally identical light sources. The light sources may be connected in series, such that the same operating current is flown through the plurality of light sources. Each light source may be provided with an optical system, as laid out below. Identical or different optical systems may be provided upon identical or different light sources. Each light source (and/or optical system) may differ from each other, or there may be an alternating pattern, or a 1-2-3- . . . . -1-2-3- . . . , 1-2-3- . . . -3-2-1, or 1-1-2-2-3-3-4-4- . . . -type pattern. Such patterns allow for tailoring the illumination shape and/or intensity without complicated circuitry or programming.

According to a further embodiment, the length of the housing is in a range of from 3 to 100 times, in particular 5 to 90 times, further in particular 15 to 80 times, further in particular 25 to 75 times, further in particular 50 to 70 times, the width of the housing. The longer profile of the aircraft vertical stabilizer illumination light may limit aerodynamic resistance and/or improve the projection of light onto the vertical stabilizer, particularly in comparison to aircraft vertical stabilizer illumination lights with circular-shaped light output surfaces of previous approaches.

According to a further embodiment, the aircraft vertical stabilizer illumination light comprises, for each light source, an optical system, comprising a reflector, a lens, a shutter, or a combination of two or more of any of these. The optically effective components, i.e. the reflector, lens, and/or shutter, may make up at least 75 weight % of the optical system. The optical system may comprise a collimating reflector and a collimating lens, or consist essentially of, or consist of the collimating reflector and collimating lens. The collimating reflector and collimating lens may be arranged and configured to collimate separate portions of light emitted by a respective light source. The collimating reflector may be hemispherical, partially spheroid, or parabolic, in shape.

It is also possible that the optical system contains an extended reflector and or an extended lens and/or an extended reflector lens combination along a longitudinal axis of the housing. This extended optical system may be arranged over and shape the light output of various light sources. The extended optical system may also block undesired portions of illumination, e.g. via shutters. It is also possible that non-transparent coating(s) are provided on the lens cover to block undesired portions of illumination.

According to a further embodiment, the aircraft vertical stabilizer illumination light has a peak light emission intensity in a range of from 1000 to 20000 cd, 1500 to 17500 cd, 2000 to 15000 cd, 2500 to 12500 cd, or 3000 to 10000 cd. It is also possible that the aircraft vertical stabilizer illumination light has a peak light emission intensity of at least 1000, at least 2500, at least 5000, at least 7500, or at least 10000 cd. Such high candela intensities may be useful in the conditions suitable to illuminate the vertical stabilizer in aircraft, and/or useful in the case of an elongated and/or prismic aircraft vertical stabilizer illumination light to project at least 90%, at least 92.5%, at least 95%, at least 97.5%, or 99% of the light onto the vertical stabilizer, distinct from the requirements of illuminators of potentially similar outer geometric shape, but different application.

According to a further embodiment, the aircraft vertical stabilizer illumination light may have an angular illumination range of from 30° to 80°, from 35° to 70°, or from 45° to 60°, circumferentially towards the vertical stabilizer off the normal of a tangential plane to the top of the aircraft vertical stabilizer illumination light. That is, the aircraft vertical stabilizer illumination light may have an asymmetric illumination pattern, particularly one directionally focused to outwardly and diagonally from its upper face. Expressed another way, the aircraft vertical stabilizer illumination light may have a cross-sectional illumination opening angle of between 40° and 70°, in particular of between 45° and 60°, further in particular of about 50°, in at least one cross-section orthogonal to the longitudinal extension, whereby this illumination pattern may optionally hold for all cross-sections orthogonal to the longitudinal extension of the housing. Such an illumination pattern allows for efficient illumination of a vertical stabilizer. The foregoing definition of angles is based on the assumption that the tangential plane to the top of the aircraft vertical stabilizer illumination light is substantially parallel to the tangential plane of the fuselage of the aircraft at the mounting position of the aircraft vertical stabilizer illumination light. Hence, when mounted to the fuselage of the aircraft, above angular ranges can also be seen as angular ranges to the tangential plane of the fuselage of the aircraft at the mounting position of the aircraft vertical stabilizer illumination light.

According to a further embodiment, the aircraft vertical stabilizer illumination light may have a light emission intensity peak at an angle of between 20° and 40°, in particular between 25° and 35°, further in particular between 27.5° and 32.5°, to a normal to a tangential plane to the top of the aircraft vertical stabilizer illumination light. In this way, the light emission intensity peak may be at or close to the output direction towards the tip of the vertical stabilizer, thus achieving a bright illumination thereof despite the comparable large distance to the tip. The given angles are again defined in a cross-section orthogonal to the longitudinal extension of the aircraft vertical stabilizer illumination light. The described features may be present in one or more or all cross-sections orthogonal to the longitudinal extension of the housing.

According to a further embodiment, the aircraft vertical stabilizer illumination light may have an integrated light emission intensity between 25° and 50° to a normal of a tangential plane to a top of the aircraft vertical stabilizer illumination light, expressed as a percentage of a total integrated light emission intensity, in the range of from 50 to 99.5%, in particular from 60 to 99%, further in particular from 75 to 97.5%, further in particular from 90 to 95%. Said integrated light emission intensity between 25° and 50° may also be at least 90%, in particular at least 92.5%. It is also possible that the intensity pattern of the aircraft vertical stabilizer illumination light has an integrated light emission intensity between 25° and 70° to a normal of a tangential plane to a top of the aircraft vertical stabilizer illumination light, expressed as a percentage of a total integrated light emission intensity, in the range of from 50 to 99.5%, in particular from 60 to 99%, further in particular from 75 to 97.5%, further in particular from 90 to 95%. In this way, a large amount of the light output may be focused towards the vertical stabiliter, resulting in a particularly efficient illumination thereof. Such intensity patterns may shift based on the circumferential disposition of the aircraft vertical stabilizer illumination light on the fuselage with respect to the vertical stabilizer. The given angles are again defined in a cross-section orthogonal to the longitudinal extension of the aircraft vertical stabilizer illumination light. The described features may be present in one or more or all cross-sections orthogonal to the longitudinal extension of the housing.

According to a further embodiment, the total stray light emission of the aircraft vertical stabilizer illumination light, i.e., the light not illuminating the vertical stabilizer, but passing the front, rear and top edges of the vertical stabilizer, is less than 25%, less than 20%, less than 15%, less than 10%, less than 5%, less than 2.5%, or less than 1%, given as a percentage of total light emission of the aircraft vertical stabilizer illumination light. By limiting stray light, the aircraft vertical stabilizer illumination light can save energy, can reduce long term costs, and can be less disturbing to nearby pilots.

According to a further embodiment, the aircraft vertical stabilizer illumination light, in particular the housing thereof, may have a width in a range of from 25 to 75 mm, in particular from 35 to 65 mm, further in particular from 45 to 55 mm, and/or a height in a range of from 10 to 50 mm, in particular from 15 to 40 mm, further in particular from 20 to 30 mm. In addition to or independently from these dimensions, the aircraft vertical stabilizer light, in particular the housing thereof, may have a length of from 500 mm to 3500 mm, in particular of from 1000 mm to 3000 mm, further in particular of from 1500 mm to 2500 mm. The aircraft vertical stabilizer illumination light may have, for example, dimensions of 15 to 30 mm high, 40 to 60 mm wide, and 1000 to 2500 mm longe.g., 25×50×2000 mm. It is also possible that the height and the width are substantially the same or very similar to each other, e.g. within 10% of each other.

According to a further embodiment, the aircraft vertical stabilizer illumination light may have a weight in a range of from 0.25 to 5 kg, in particular between 0.5 and 3 kg, further in particular between 0.5 and 1 kg.

According to a further embodiment, the aircraft vertical stabilizer illumination light emits white light in operation.

Exemplary embodiments of the invention further include an aircraft including a fuselage, a left wing and a right wing, a vertical stabilizer, and an aircraft vertical stabilizer illumination light, as described in any of the embodiments herein, mounted to the fuselage adjacent the vertical stabilizer. The additional features, modifications, and effects, described above with respect to the aircraft vertical stabilizer illumination light, apply to the aircraft in an analogous manner.

The aircraft vertical stabilizer illumination light may be mounted along the vertical stabilizer. In particular, the aircraft vertical stabilizer illumination light may be mounted along the vertical stabilizer, with the length of the housing being arranged substantially along the vertical stabilizer, i.e. along the longitudinal extension of the vertical stabilizer in the aircraft frame of references.

According to a further embodiment, the aircraft may comprise two such aircraft vertical stabilizer illumination lights, one disposed to the left of the vertical stabilizer and one disposed to the right of the vertical stabilizer. The left and right aircraft vertical stabilizer illumination lights may be nominally identical, i.e. they may have the same part number.

According to a further embodiment, the aircraft may have, on each side of the vertical stabilizer, two or three or more aircraft vertical stabilizer illumination lights, arranged in a one behind the other arrangement. In this way, the illumination of the vertical stabilizer may be split up among different aircraft vertical stabilizer illumination lights for larger aircraft, while single lights may be used for smaller aircraft, increasing production efficiency.

According to a further embodiment, the aircraft vertical stabilizer illumination light or the two aircraft vertical stabilizer illumination lights may be spaced from the vertical stabilizer by from 0.25 to 2 m, in particular from 0.5 to 1 m, further in particular from 0.7 to 0.9 m.

According to a further embodiment, the aircraft comprises a left horizontal stabilizer and a right horizontal stabilizer, a left aircraft vertical stabilizer illumination light, as described an any of the embodiments herein, mounted to the fuselage between the left horizontal stabilizer and the vertical stabilizer, and a right aircraft vertical stabilizer illumination light, as described in any of the embodiments herein, mounted to the fuselage between the right horizontal stabilizer and the vertical stabilizer. Each of the left and right aircraft vertical stabilizer illumination lights may be spaced from the vertical stabilizer from 10 to 75%, in particular from 15 to 50%, further in particular from 25 to 45%, of the length of the arc between the vertical stabilizer and the respective horizontal stabilizer.

According to a further embodiment, a longitudinal axis of the aircraft vertical stabilizer illumination light is skewed from parallel to a longitudinal axis of the fuselage of the aircraft by less than 15°, in particular less than 10°, further in particular less than 5°. Further in particular, the longitudinal axis of the aircraft vertical stabilizer illumination light may be skewed from parallel to the longitudinal axis of the fuselage by between 1° and 15°, in particular by between 5° and 10°.

According to a further embodiment, the longitudinal axis of the aircraft vertical stabilizer illumination light may be tilted backwards, i.e. the back end being lower then the front end. In this way, the arrangement of the aircraft vertical stabilizer illumination light helps in minimizing stray light towards the front of the aircraft, which is highly undesired, because white stray light to the front could be confused with light stemming from a rear navigation light.

According to a further embodiment, the aircraft vertical stabilizer illumination light has a forward stray light angle and/or a rearward stray light angle of less than 20°, in particular less than 10°, with respect to a cross-sectional plane orthogonal to the longitudinal extension. In other words, when looking at the aircraft vertical stabilizer illumination light from the side, the stray light towards the left and/or towards the right is confined in an angular range of less than 20°, in particular less than 10°, with respect to a straight up direction. In this way, the level of disturbing stray light in undesired directions can be kept low. The stray light angle may be defined as that angle where the light intensity has decayed to 1% of the peak light intensity.

The aircraft may be an airplane, in particular a commercial passenger or cargo airplane.

BRIEF DESCRIPTION OF THE FIGURES

Exemplary embodiments of the invention are described in even greater detail below based on the exemplary figures. The invention is not limited to the exemplary embodiments. All features described and/or illustrated herein can be used alone or together in different combinations in embodiments of the invention. The features and effects of various embodiments of the present invention will become apparent by reading the following detailed description with reference to the attached drawings.

DETAILED DESCRIPTION

Figure 1:
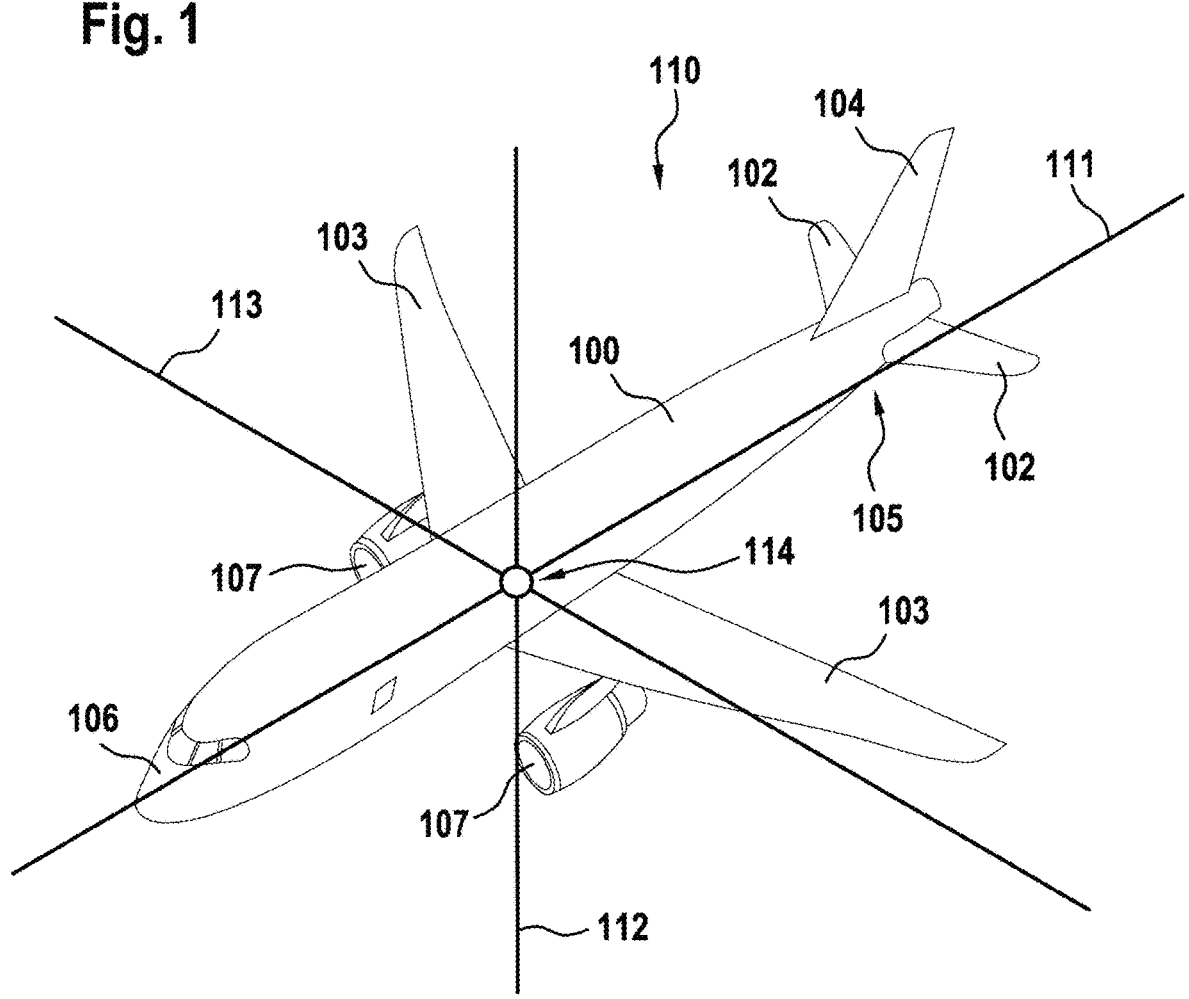
FIG. 1 shows an exemplary airplane, illustrating its axes and center of gravity.

In reference to the drawings, FIG. 1 illustrates an airplane 110 having a fuselage 100, wings 103 with attached engines 107, and a vertical stabilizer 104 and left and right horizontal stabilizers 102 arranged at a tail portion 105 of the fuselage 100, opposite the nose 106 of the fuselage 100. The airplane 110 may be equipped with an aircraft vertical stabilizer illumination light in accordance with exemplary embodiments of the invention, as described herein. This will be described in detail with respect to FIGS. 5-10 below. When equipped with one or two such aircraft vertical stabilizer illumination light(s), the airplane 110 of FIG. 1 forms an exemplary embodiment of the invention.

The various axes shown in FIG. 1 are referenced herein, wherein the front (including in reference to the aircraft vertical stabilizer illumination light) generally means the direction along the longitudinal axis 111 of the airplane 110 towards the nose 106, while the top or upper surface would be the radially outer portion in the arc from the normal axis 112 to the lateral axis 113, i.e., in the orthogonal plane to the longitudinal axis. The height of the aircraft vertical stabilizer illumination light may be radially outward with respect to the longitudinal axis 111 of the airplane 110, while the length of the aircraft vertical stabilizer illumination light is relative to the longitudinal axis 111 of the airplane 110, and may optionally be substantially parallel to the longitudinal axis 111 (as noted above, there may be a relative skew). The center of gravity of the airplane 110 is indicated with reference numeral 114 in FIG. 1.

Figure 2:
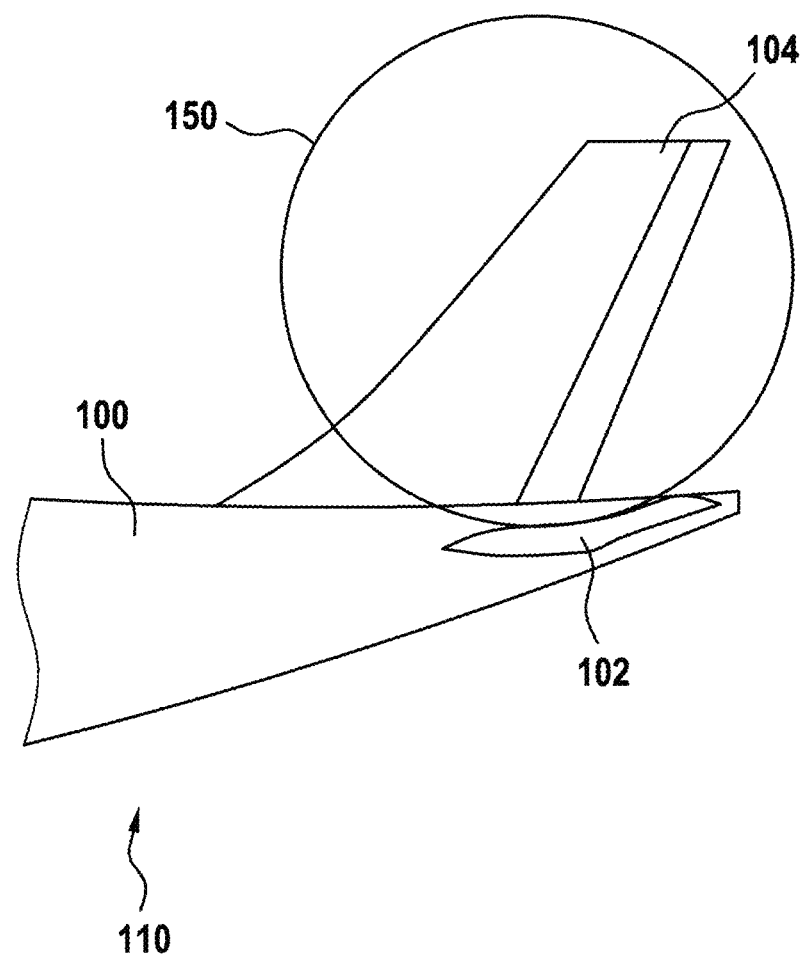
FIG. 2 shows a customary aircraft vertical stabilizer illumination light, including its illumination cone.
Figure 3:
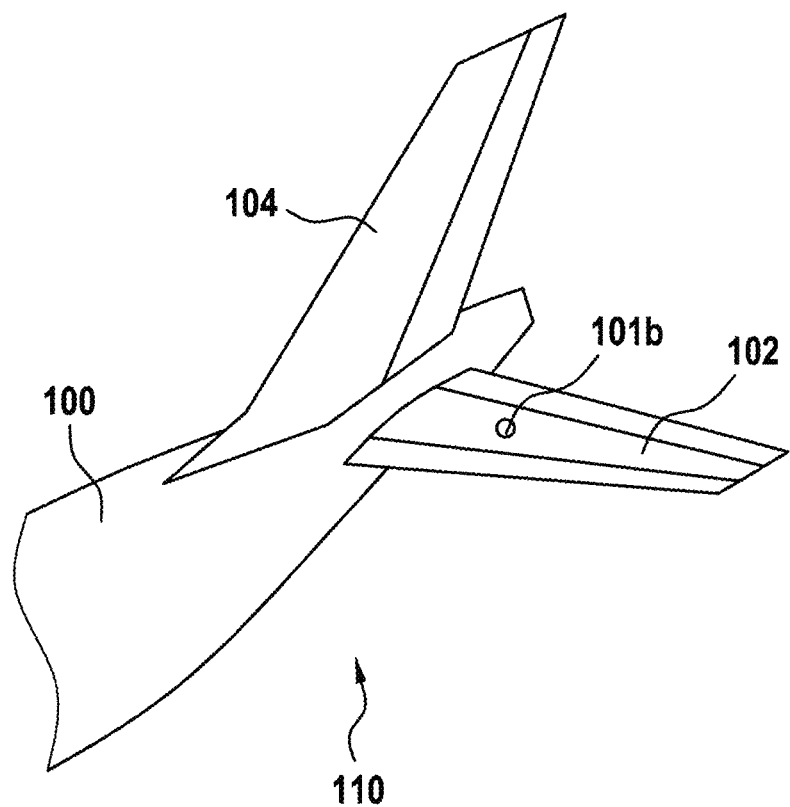
FIG. 3 shows a customary aircraft vertical stabilizer illumination light and its position in the horizontal stabilizer of an airplane.

A customary aircraft vertical stabilizer illumination light 101b and its illumination cone 150 are shown in the context of an airplane 110 in FIGS. 2 and 3, with only a rear portion of the airplane 110 being depicted. The fuselage 100 has two horizontal stabilizers 102 at the tail portion 105 of the fuselage 100, one being shown in the side view of FIG. 2. As also laid out with respect to FIG. 1, the airplane 110 has a vertical stabilizer 104, mounted atop the fuselage 100 at the tail portion 105. The horizontal stabilizer 102 has an aircraft vertical stabilizer illumination light 101b arranged thereon, which emits light towards the vertical stabilizer 104. The circle 150 in FIG. 2 illustrates the illumination cone of the customary aircraft vertical stabilizer illumination light 101b. As seen in FIG. 2, the illumination cone 150 irradiates a large portion of the vertical stabilizer 104, but also a large amount of the background by light passing by the vertical stabilizer 104 and not illuminating the vertical stabilizer 104.

FIG. 3 shows the customary arrangement of FIG. 2, from a perspective view, where the customary aircraft vertical stabilizer illumination light 101b, having a circular light emission surface, rests in the horizontal stabilizer 102, spaced from the fuselage 100. When the horizontal stabilizer 102 rotates in flight due to pilot control actions, the illumination cone 150, as shown in FIG. 2, also rotates.

Figure 4:
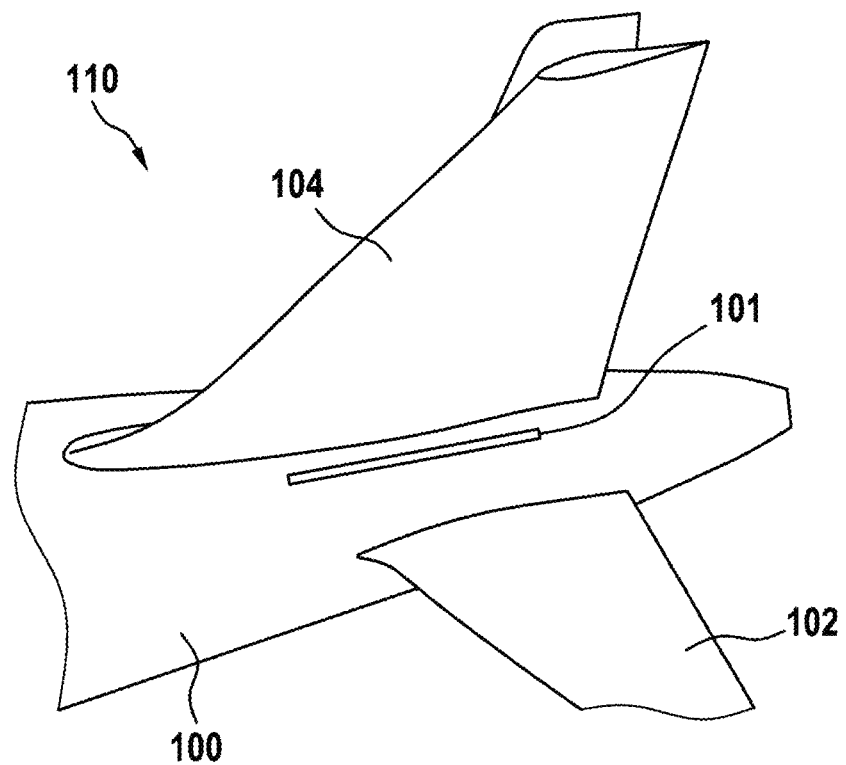
FIG. 4 shows an airplane in accordance with an exemplary embodiment of the invention, equipped with an aircraft vertical stabilizer illumination light according to an exemplary embodiment of the invention, in a top perspective view.

FIG. 4 illustrates an airplane 110 in accordance with an exemplary embodiment of the invention in an upper perspective view, the airplane 110 being equipped with an aircraft vertical stabilizer illumination light 101 in accordance with an exemplary embodiment of the invention. In the depicted arrangement, the aircraft vertical stabilizer illumination light 101 is mounted on the fuselage 100 between the vertical stabilizer 104 and the horizontal stabilizer 102. As the airplane 110 is shown from the left side, only one aircraft vertical stabilizer illumination light 101 is depicted. This aircraft vertical stabilizer illumination light 101 is arranged between the vertical stabilizer 104 and the left horizontal stabilizer 102. It is understood that an analogous aircraft vertical stabilizer illumination light is provided between the vertical stabilizer 104 and the right horizontal stabilizer. The longitudinal axis of the aircraft vertical stabilizer illumination light 101 may be parallel to the longitudinal axis of the fuselage 100, or the longitudinal axis of the aircraft vertical stabilizer illumination light 101 may be skewed relative to the longitudinal axis of the fuselage 100. The aircraft vertical stabilizer illumination light 101 is substantially arranged in a front-to-rear direction of the airplane 110.

Figure 5:
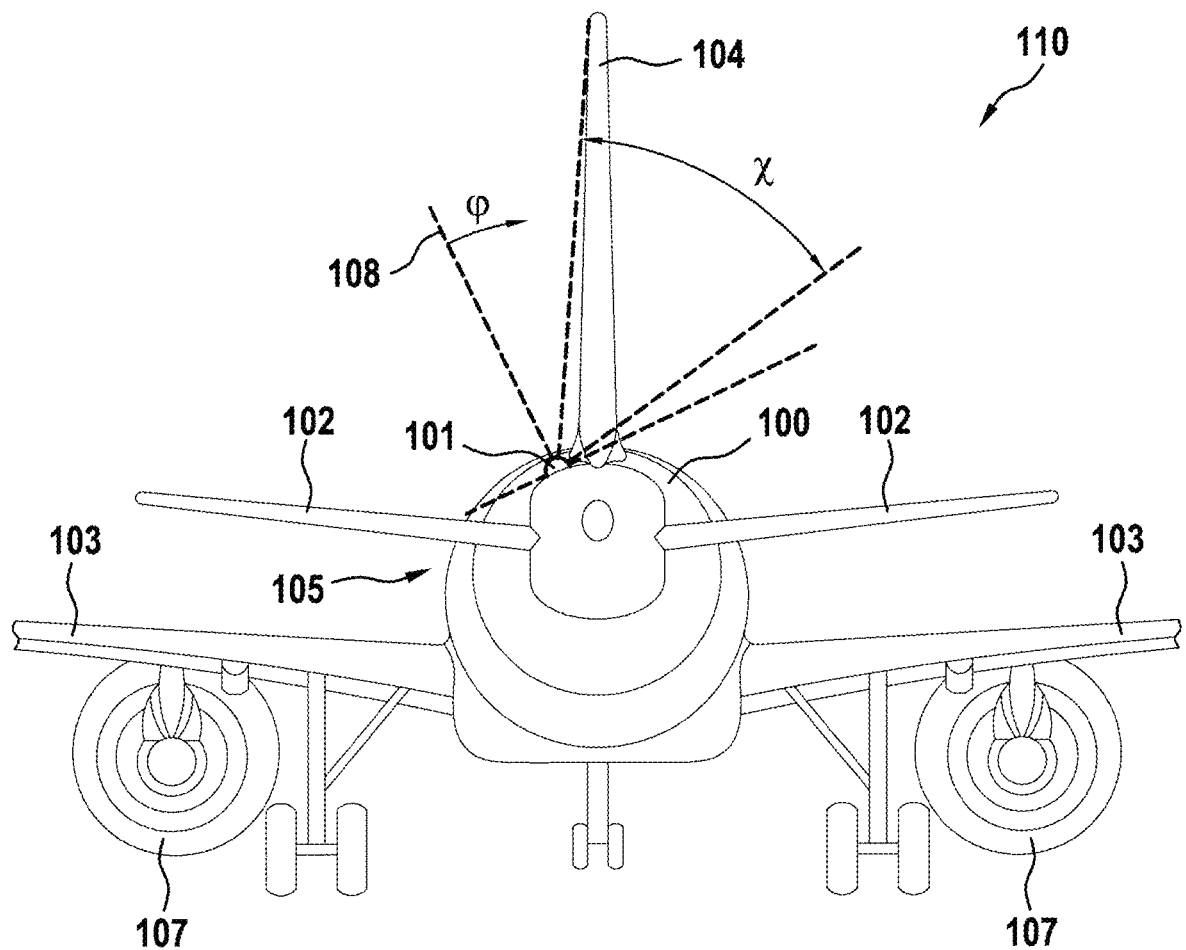
FIG. 5 shows an airplane in accordance with an exemplary embodiment of the invention, equipped with an aircraft vertical stabilizer illumination light according to an exemplary embodiment of the invention, in a rear view.

FIG. 5 shows an airplane 110 in accordance with an exemplary embodiment of the invention, in a rear elevational view, the airplane 110 being equipped with an aircraft vertical stabilizer illumination light 101 in accordance with an exemplary embodiment of the invention. The airplane 110 of FIG. 5 may be the same airplane as the airplane 110 of FIG. 4, shown in a different perspective. The left aircraft vertical stabilizer illumination light 101 is mounted on the fuselage 100 between the vertical stabilizer 104 and the left horizontal stabilizer 102 near the tail of the fuselage 100 aft of the wings (103), under which the engines (107) are mounted. It is understood that the airplane 110 has an analogous right aircraft vertical stabilizer illumination light, which is, however, not shown, in order not to overcrowd FIG. 5.

FIG. 5 further shows a normal direction 108, off which the aircraft vertical stabilizer illumination light 101 irradiates the vertical stabilizer 104 at an angle φ, relative to the normal direction 108. In the exemplary embodiment of FIG. 5, the aircraft vertical stabilizer illumination light provides illumination in an angular illumination range of from φ=30° to φ=80°. This can also be expressed as the aircraft vertical stabilizer illumination light 101 having an illumination opening angle χ of 50° towards the vertical stabilizer. The normal direction 108 and the angles φ and χ are depicted in a viewing direction straight from the rear of the airplane 110 in FIG. 5. It is also valid to define said parameters in a cross-sectional plane through the aircraft vertical stabilizer illumination light 101 orthogonal to the longitudinal extension thereof. It is further also valid to define said parameters with respect to a tangential plane to a top of the aircraft vertical stabilizer illumination light 101, in particular when the housing of the aircraft vertical stabilizer illumination light 101 has a rounded lens cover, as described below. The given angles φ and χ may apply to one or more or all cross-sections through the aircraft vertical stabilizer illumination light 101.

It is pointed out that above described angular illumination range of from φ=30° to φ=80° is exemplary only. It is apparent that this range may be adapted, depending on the size of the vertical stabilizer 104, the distance between the vertical stabilizer 104 and the aircraft vertical stabilizer illumination light 101, and the curvature of the fuselage in the tail portion thereof. In particular, the angular illumination range may become smaller, the larger the distance to the vertical stabilizer 104 is and the farther the aircraft vertical stabilizer illumination light 101 is positioned downwards on the arc towards the horizontal stabilizer 102. For example, the angular illumination range may be from φ=35° to φ=70° or from φ=45° to φ=60°. It is pointed out that the expression of the angular illumination range being from φ=30° to φ=80° does not mean that illumination is exclusively present in this angular range. It rather means that illumination is at least present in the given angular range. Stray light outside of said range is not excluded by the given terminology.

Figure 6:
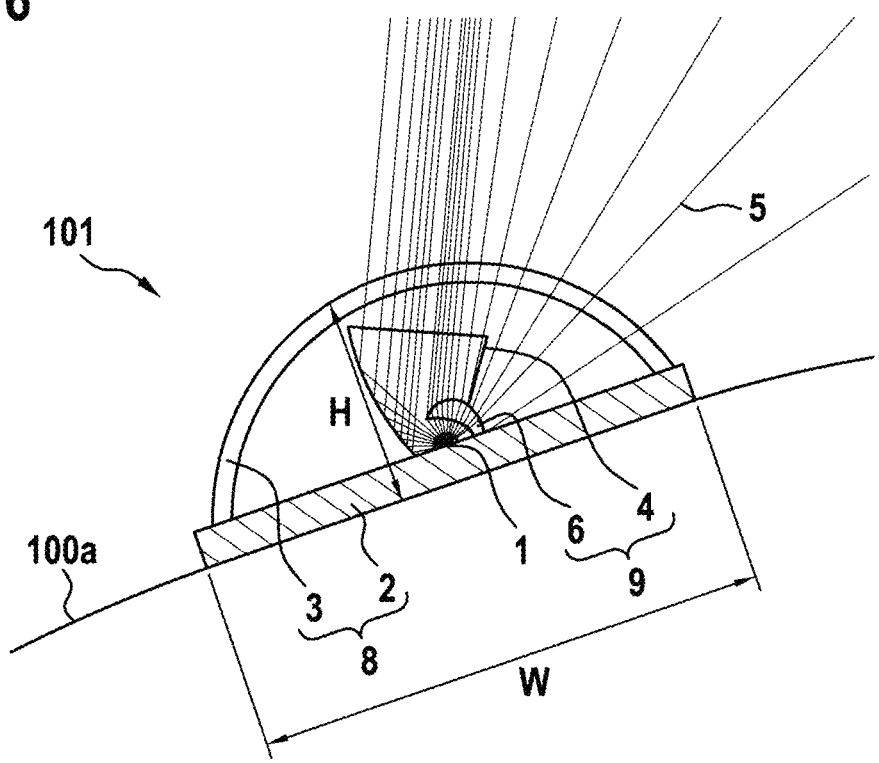
FIG. 6 shows an aircraft vertical stabilizer illumination light according to an exemplary embodiment of the invention in a cross-sectional view.

FIG. 6 shows an aircraft vertical stabilizer illumination light 101 in accordance with an exemplary embodiment of the invention in a cross-sectional view. The cross-sectional view is orthogonal to the longitudinal extension of the aircraft vertical stabilizer illumination light 101 and cuts through one of the lights sources, denoted with reference numeral 1.

The aircraft vertical stabilizer illumination light 101 has a housing 8, which comprises a mounting structure 2 and a lens cover 3. In the depicted exemplary embodiment, the mounting structure 2 is a mounting plate, having substantially even upper and lower faces. The mounting plate has a width W in the depicted cross-section and in other cross-sections. The mounting plate has substantially rectangular upper and lower faces. The lens cover 3 has a semi-tube-like shape. It is arranged on the mounting structure 2 and creates an inner space between the mounting structure 2 and the lens cover 3. The lens cover 3 is made from highly resistant transparent or translucent material. In particular, the lens cover 3 may be resistant to wide temperature variations, particle strikes, and hydraulic fluids, as described above. The mounting structure and the lens cover 3 together have the height H.

The aircraft vertical stabilizer illumination light 101 has a plurality of light sources 1, with one of them being arranged and shown in the cross-sectional plane of FIG. 6. The plurality of light sources are arranged in a linear manner on the mounting structure 2 along the longitudinal extension of the aircraft vertical stabilizer illumination light 101. The other light sources are arranged in front of and behind the drawing plane of FIG. 6. In the exemplary embodiment of FIG. 6, the light sources 1 are LEDs.

Each of the light sources 1 is provided with an optical system 9 for directing the light of the light source towards the vertical stabilizer of the aircraft. In the exemplary embodiment of FIG. 6, the optical system 9 has a collimating reflector 4 and a collimating lens 6. The collimating reflector 4 is shaped to collimate the light from the light source 1 substantially towards the tip of the vertical stabilizer. As the tip of the vertical stabilizer is the region of the vertical stabilizer that is farthest removed from the aircraft vertical stabilizer illumination light 101, a high light intensity in the direction of the tip is desired. In the exemplary embodiment of FIG. 6, the collimating reflector 4 is parabolic and is shaped like a partial cup, in particular like a cup having a sector towards the vertical stabilizer cut out. For shaping the light not affected by the collimating reflector 4, the collimating lens 6 is provided. The collimating lens 6 is arranged to affect the light leaving the light source 1 towards the top and towards the cut-out portion of the collimating reflector 4. The collimating lens 6 is a custom-shaped lens that distributes the captured light over the vertical stabilizer. The light leaving the collimating lens 6 has a smaller angular range in the depicted cross-sectional plane than the light hitting the collimating lens 6. Hence, the collimating lens 6 is referred to as collimating. It is pointed out, however, that any kind of optical system may be employed that effectively distributes the light from the light source 1 over the vertical stabilizer, in particular over the full height of the vertical stabilizer in at least a vertical corridor thereof. The shaping of the output light intensity distribution by the optical system 9 is illustrated by a plurality of exemplary light rays 5.

The mounting structure 2 is attached to the outer skin 100a of the fuselage 100. It is also possible that the aircraft vertical stabilizer illumination light 101 is sunk into a corresponding recess in the fuselage 100. In the latter case, the lens cover may be shaped to be flush with the outer skin 100a of the fuselage 100. In particular, the lens cover may have a substantially plane shape, with the mounting structure having a u-like cross-section corresponding to the shape of the recess. This is further discussed with respect to FIG. 11.

Figure 7:
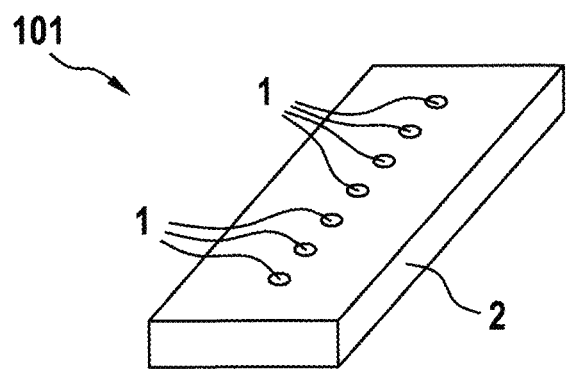
FIG. 7 shows an aircraft vertical stabilizer illumination light according to an exemplary embodiment of the invention in a top perspective view.

FIG. 7 shows the mounting plate 2 of the aircraft vertical stabilizer illumination light 101 of FIG. 6 in a top perspective view. In addition, the plurality of light sources 1 are shown in FIG. 7. The plurality of light sources 1 are arranged along the length of the mounting plate 2 in a spaced, linear arrangement. For ease of illustration, only the light sources 1 are shown. It is understood that each light source 1 may be provided with an optical system 9, such as the optical system discussed above with respect to FIG. 6, and that a lens cover may be arranged over the light sources 1 and the associated optical systems.

Figure 8:
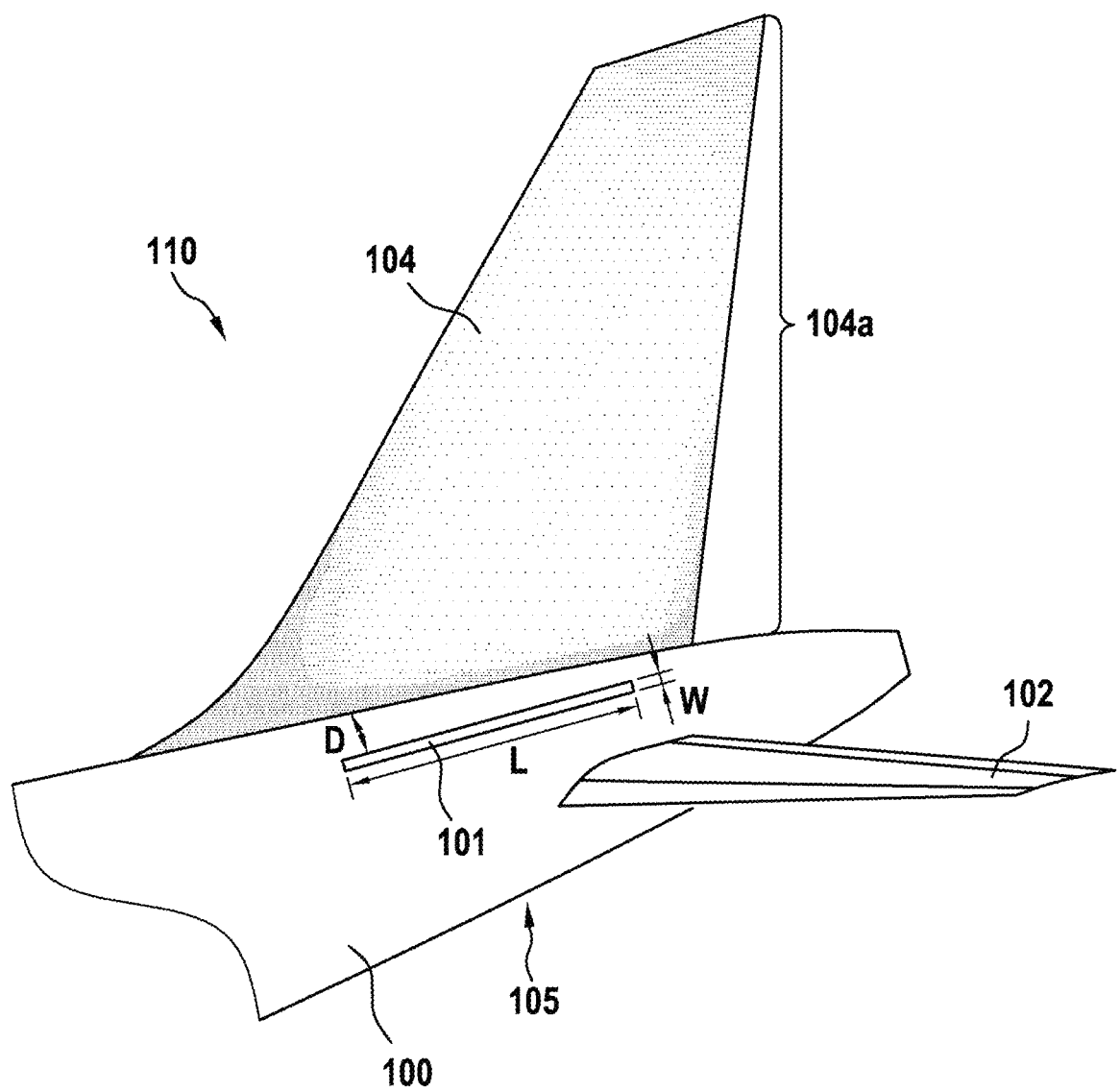
FIG. 8 shows an illumination pattern upon a vertical stabilizer, effected by an aircraft vertical stabilizer illumination light in accordance with an exemplary embodiment of the invention.

FIG. 8 shows an airplane 110 in accordance with an exemplary embodiment of the invention, equipped with an aircraft vertical stabilizer illumination light 101 in accordance with an exemplary embodiment of the invention. In particular, FIG. 8 shows, in an upper perspective view, a tail portion 105 of the fuselage 100 and illustrates the width W and the length L of the aircraft vertical stabilizer illumination light 101, which has a displacement D along the circumferential arc from the vertical stabilizer 104. FIG. 8 shows the illumination distribution 104a on the vertical stabilizer 104, when illuminated by the aircraft vertical stabilizer illumination light 101. Unlike a conically outwardly fading illumination of customary aircraft vertical stabilizer illumination lights, the present illumination pattern 104a exhibits a high degree of uniformity of illumination of the vertical stabilizer 104. In particular, the vertical stabilizer may experience a highly uniform illumination of at least 100 1x. The illumination patterns of aircraft vertical stabilizer illumination lights in accordance with exemplary embodiments of the invention may not be centered around a point, due to the plurality of light sources 1, optionally aided by optical systems, within the aircraft vertical stabilizer illumination light 101.

Figure 9:
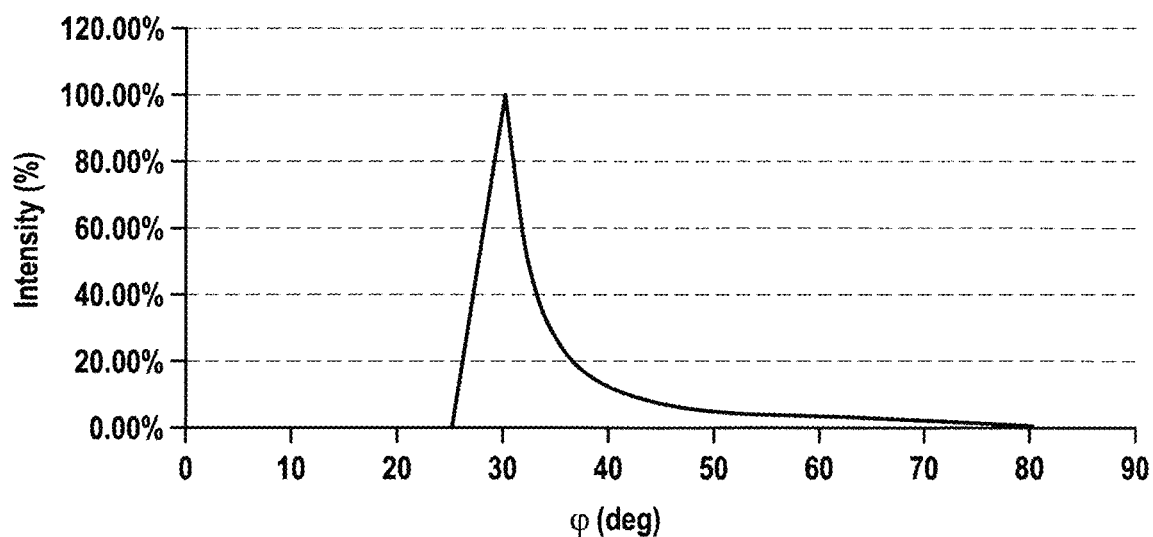
FIG. 9 shows an exemplary graph of a cross-sectional output light intensity distribution of an aircraft vertical stabilizer illumination light in accordance with an exemplary embodiment of the invention.

FIG. 9 relates to the framework of FIG. 5 and illustrates the light intensity, as emitted by an aircraft vertical stabilizer illumination light in accordance with an exemplary embodiment of the invention, as a function of the angle $\varphi$, i.e. as a function of the angle with respect to the lens normal in a cross-sectional plane orthogonal to the longitudinal extension of the aircraft vertical stabilizer illumination light, as discussed above. In particular, FIG. 9 shows the relative light intensity as a percentage value with respect to the peak light intensity. The peak light intensity is at an angle of $\varphi=30°$, which coincides with the direction towards the tip of the vertical stabilizer. From $\varphi=30°$ to $\varphi=80°$, the light intensity decreases monotonically. The rate of decrease takes into account the decrease in distance towards the respective portions of the vertical stabilizer and the quadratic relationship between the distance to the illumination target and the required intensity for reaching a homogeneous level of illumination.

Figure 10:
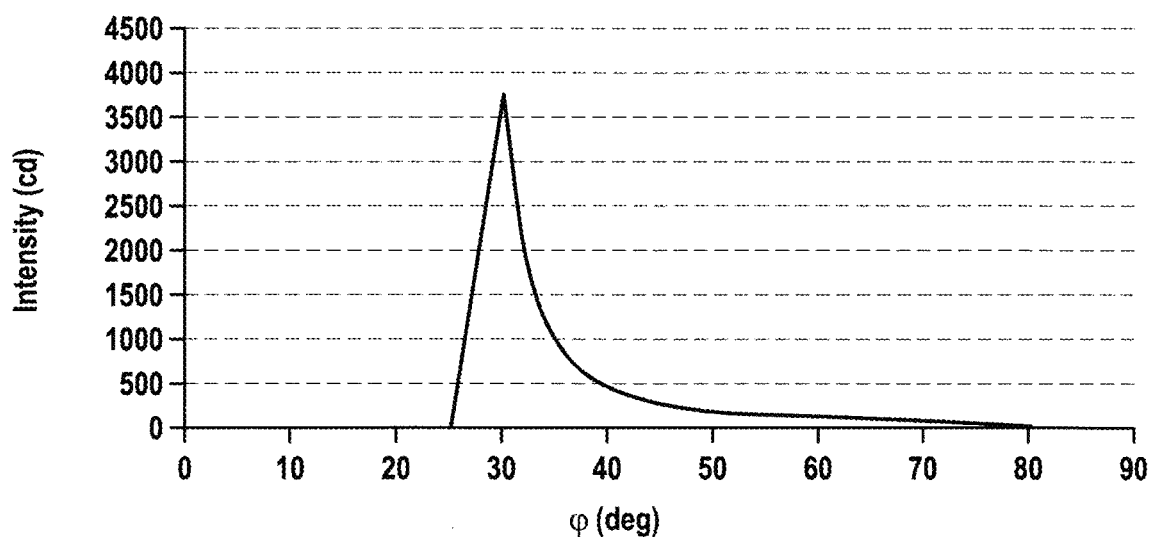
FIG. 10 shows another exemplary graph of a cross-sectional output light intensity distribution of an aircraft vertical stabilizer illumination light in accordance with an exemplary embodiment of the invention.

FIG. 10 shows the output light intensity distribution of FIG. 9 in absolute cd values. With the depicted absolute light intensity values, having a peak of close to 4000 cd, the aircraft vertical stabilizer illumination light may be readily used for a commercial short to medium range airplane, such as the Airbus A320 ®. The output light intensity distribution of FIGS. 9 and 10 is further characterized by the fact that the vast majority of the total light output is provided in an angular range between $\varphi=25°$ and $\varphi=50°$. In this way, it is ensured that the vast majority of the total light output is used for illuminating the vertical stabilizer, and not much light is wasted by passing around the vertical stabilizer. In particular, the integral of the output light intensity distribution of the aircraft vertical stabilizer illumination light between φ=25° and φ=50° may be more than 90% of the total integral of the output light intensity distribution, i.e. the integral from φ=−90° to φ=90°.

Figure 11:
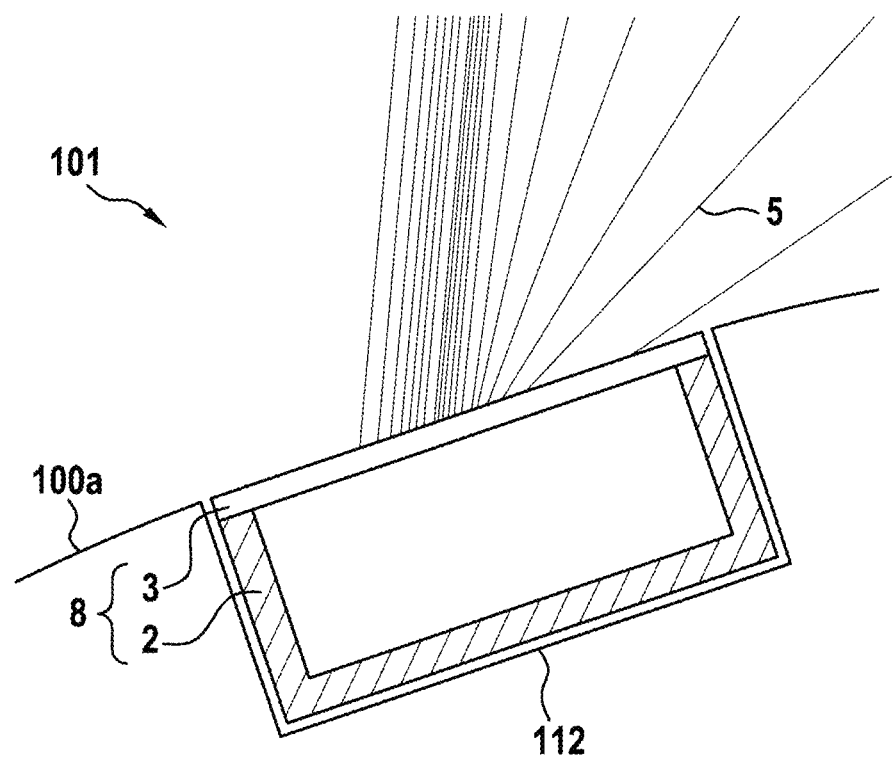
FIG. 11 shows an aircraft vertical stabilizer illumination light according to another exemplary embodiment of the invention in a cross-sectional view.

FIG. 11 shows an aircraft vertical stabilizer illumination light 101 in accordance with an exemplary embodiment of the invention in a schematic, cross-sectional view. In particular, only the housing 8 and the light output 5 of the aircraft vertical stabilizer illumination light 101 is shown. It is understood that the plurality of light sources 1 and one or more suitable optical systems are disposed between the mounting structure 1 and the lens cover 3. As already indicated with respect to FIG. 6, it is also possible to arrange the aircraft vertical stabilizer illumination light 101 in a recess in the aircraft fuselage. This is illustrated in FIG. 11.

In the exemplary embodiment of FIG. 11, the outer skin 100a of the fuselage 100 of the aircraft has a recess 112. This recess 112 may in particular be arranged adjacent to the vertical stabilizer of the aircraft, in particular between the vertical stabilizer of the aircraft and a horizontal stabilizer. The recess has a size to receive the housing 8 of the aircraft vertical stabilizer illumination light 101. In the exemplary embodiment of FIG. 11, the mounting structure 2 of the housing 8 is u-shaped in cross-section. The lens cover 3 of the housing 8 is substantially planar and is flush with the outer skin 100a of the fuselage 100. The exemplary light rays 5 again illustrate the output light intensity distribution. It is understood that the aircraft vertical stabilizer illumination light 101 may have a different optical system and/or a different lens cover than the aircraft vertical stabilizer illumination light 101 of FIG. 6, in order to account for the different geometry of the mounting structure and the different angles at which the light hits the lens cover. For example, the lens cover may be entirely or partly shaped like a Fresnel lens to allow coupling out of light at shallow angles. Also, the optical system may comprise additional or alternative reflectors and/or other optical elements for directing the light into desired directions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft vertical stabilizer illumination light, configured to illuminate a vertical stabilizer of an aircraft, the aircraft vertical stabilizer illumination light comprising:
a housing having a length (L), a width (W), and a height (H), the length (L) being greater than the width (W) and the height (H); and
a plurality of light sources,
wherein the plurality of light sources are arranged spaced along the length (L) of the housing for a distributed illumination of the vertical stabilizer, and
wherein the housing (8) is configured to be mounted adjacent the vertical stabilizer on a tail portion of a fuselage of the aircraft; and
wherein the illumination light had a light emission intensity peak at an angle (φ) of between 20° and 40°, to a normal of a tangential plane to a top of the aircraft vertical stabilizer illumination light.

2. The aircraft vertical stabilizer illumination light of claim 1, wherein the plurality of light sources are arranged in a substantially linear manner.

3. The aircraft vertical stabilizer illumination light of claim 1,
wherein the housing comprises a mounting structure, and
wherein the mounting structure is configured for being mounted to an outside skin of the tail portion of the fuselage or wherein the mounting structure is configured to be inserted into a corresponding recess in the tail portion of the fuselage.

4. The aircraft vertical stabilizer illumination light of claim 1,
wherein the housing comprises a lens cover resistant to temperatures in a range of from −55 to +70° C., and
wherein the lens cover is formed as a single, contiguous sheet comprising at least one of glass, polycarbonate, and polymethylmethacrylate.

5. The aircraft vertical stabilizer illumination light of claim 4, wherein the lens cover is resistant to hydraulic fluids present in a jet aircraft operational environment.

6. The aircraft vertical stabilizer illumination light of claim 1, wherein the plurality of light sources comprise 2 to 15 light sources per meter along the length (L) of the housing.

7. The aircraft vertical stabilizer illumination light of claim 6, wherein the light units are LEDs.

8. The aircraft vertical stabilizer illumination light according to claim 1, wherein the length (L) is in a range of from 3 to 100 times the width (W).

9. The aircraft vertical stabilizer illumination light according to claim 1, further comprising, for each of the plurality of light sources, an optical system, comprising a reflector, a lens, a shutter, or a combination of two of the reflector, lens and shutter;
wherein the optical system in particular comprises a collimating reflector and a collimating lens, with the collimating reflector and the collimating lens in particular being arranged and configured to collimate separate portions of light emitted by a respective light source.

10. The aircraft vertical stabilizer illumination light according to claim 1, having a peak light emission intensity in a range of from 1000 to 20000 cd.

11. The aircraft vertical stabilizer illumination light according to claim 1, having, in operation, an angular illumination range of from 30° to 80°, circumferentially towards the vertical stabilizer off the normal of a tangential plane to a top of the aircraft vertical stabilizer illumination light.

12. The aircraft vertical stabilizer illumination light according to claim 1, having an integrated light emission intensity between 25° and 50° to a normal of a tangential plane to a top of the aircraft vertical stabilizer illumination light, expressed as a percentage of a total integrated light emission intensity, in the range of from 50 to 99.5.

13. The aircraft vertical stabilizer illumination light according to claim 1,
wherein the width (W) is in a range of from 25 to 75 mm, and
wherein the height (H) is in a range of from 10 to 50 mm.

14. The aircraft vertical stabilizer illumination light according to claim 1, having a weight in a range of from 0.25 to 5 kg.

15. An aircraft, comprising:
a fuselage;
a left wing and a right wing;
a vertical stabilizer; and
an aircraft vertical stabilizer illumination light of claim 1, mounted upon the fuselage adjacent the vertical stabilizer, wherein the aircraft vertical stabilizer illumination light is displaced from the vertical stabilizer by between 0.5 m and 1 m.

16. The aircraft of claim 15, wherein a longitudinal axis of the aircraft vertical stabilizer illumination light is skewed from parallel to a longitudinal axis of the fuselage by less than 15°.

17. The aircraft of claim 15, wherein a longitudinal axis of the aircraft vertical stabilizer illumination light is skewed from parallel to a longitudinal axis of the fuselage by less than 10°.

18. The aircraft of claim 15, wherein a longitudinal axis of the aircraft vertical stabilizer illumination light is skewed from parallel to a longitudinal axis of the fuselage by less than 5°.

19. The aircraft vertical stabilizer illumination light of claim 1, wherein the plurality of light sources are arranged in a substantially linear manner within 15% of the width (W) from a longitudinal axis of the housing bisecting the width (W).

20. The aircraft vertical stabilizer illumination light of claim 1, wherein the plurality of light sources are arranged in a substantially linear manner within 5% of the width (W) from a longitudinal axis of the housing bisecting the width (W).

\* \* \* \* \*